Figure 1:
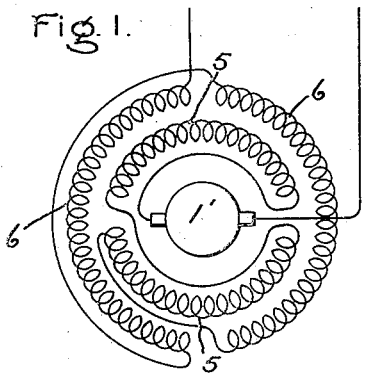

A. F. WELCH.
UNIVERSAL MOTOR.
APPLICATION FILED JAN. 4, 1918.

1,328,467.

Patented Jan. 20, 1920.

Inventor:
Alfred F. Welch,
by
His Attorney.

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

UNIVERSAL MOTOR.

1,328,467.      Specification of Letters Patent.      Patented Jan. 20, 1920.

Application filed January 4, 1918. Serial No. 210,259.

*To all whom it may concern:*

Be it known that I, ALFRED F. WELCH, a citizen of the United States, residing at Fort Wayne, county of Allen, State of Indiana, have invented certain new and useful Improvements in Universal Motors, of which the following is a specification.

My invention relates to universal motors; that is to say, to electric motors adapted for operation at substantially the same speed under the same load conditions on either alternating current circuits of the usual commercial frequencies or on direct current circuits and at substantially the same voltage. The object of the invention is to provide an improved universal motor.

It has long been known that an electric motor having an exciting winding connected in series relation with a commutated armature winding will operate whether supplied with alternating or direct current electric energy. If such a motor is designed solely with a regard for efficient and satisfactory operation with direct current energy, its operation when supplied with alternating current energy of commercial frequency of the same voltage will be inefficient and unsatisfactory. This is principally due to the fact that the rapid alternations of the current in the alternating current circuit produce reactions and phenomena which are not encountered in a direct current circuit. If, on the other hand, the motor is designed with reference to the reactions resulting from the use of alternating current energy, and with the particular view of securing efficient and satisfactory operation on an alternating current circuit, the resulting design would not be a desirable motor to build for operation on a direct current circuit. The universal motor accordingly becomes of necessity a compromise between the most satisfactory direct current motor and the most satisfactory alternating current motor.

In the direct current motor the inductance of the exciting winding is of no consequence and need not be taken into consideration in the practical design of the motor. On the other hand, in the alternating current motor the inductance of the exciting winding is a very important factor and must be carefully considered in the motor's design. In the alternating current motor the inductance of the exciting winding reduces the power factor of the motor and causes the motor to have unsatisfactory speed torque characteristics, and for this reason the exciting winding should have as little inductance as possible; hence is usually designed with as few turns as practical considerations will permit. Furthermore, a good alternating current motor should have its armature reaction neutralized, and it is therefore desirable to employ a compensating or neutralizing winding for this purpose. The compensating and armature windings are connected in series and the armature reaction is substantially neutralized whether the motor is used on alternating current or direct current circuits. Such a compensated motor may be provided with an exciting winding of suitable design so that under equal loads the motor will operate at practically the same speeds when supplied with either alternating current energy of the usual commercial frequencies or with direct current energy and at substantially the same voltage. Such a motor of course has two independent field windings, and while its universal characteristics are very satisfactory, the use of two independent field windings is objectionable, since it materially increases the cost of the motor. In accordance with my present invention, I substitute for the two independent field windings, a single series field winding of a novel design which is not only a satisfactory equivalent of the independent compensating and exciting windings, but as will be pointed out hereinafter, produces an effective flux, the distribution of which is superior to that of universal motors as heretofore constructed, and consequently a better as well as a cheaper universal motor is obtained. My new field winding has a number of ampere turns equal to the square root of $$C^2 + E^2,$$

where C is the number of compensating ampere turns necessary for substantially neutralizing the reaction of the armature winding of the motor, and E is the number of exciting ampere turns necessary for giving efficient and satisfactory operation as a universal motor. I displace the axis of my field winding from the axis of the armature winding by an angle whose cosine is $$\frac{C}{\sqrt{C^2 + E^2}}.$$

Figure 2:
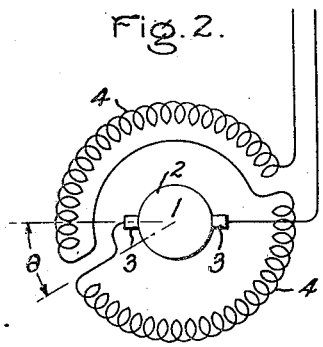
Figure 3:
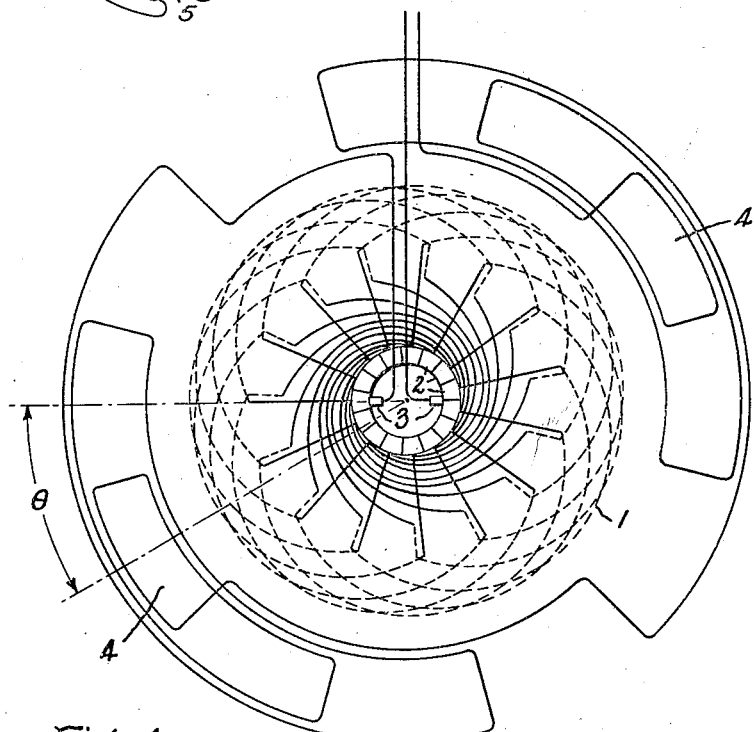
Figure 4:
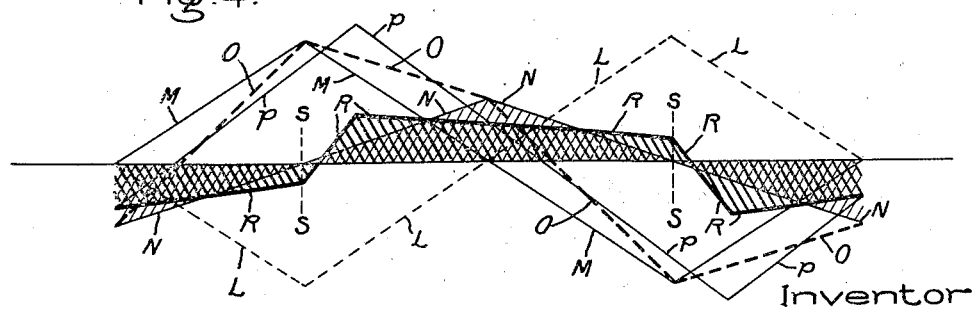

For a better understanding of my invention, reference may be had to the following description taken in connection with the accompanying drawing, in which Figure 1 is an explanatory diagram; Fig. 2 is a diagram of my motor; Fig. 3 is a diagram of the internal connections of my motor, and Fig. 4 is a flux distribution diagram.

Referring to Figs. 2 and 3 of the drawing, 1 is an ordinary direct current armature winding connected to a commutator 2 on which brushes 3 bear. A field winding 4 connected in series with the armature winding 1 has a number of ampere turns calculated as explained above and the axis of which is displaced by an angle $\theta$ from the axis of the armature winding, the angle $\theta$ being determined as explained above.

One method that I have used for determining the number of ampere turns in the field winding and the angle $\theta$ consists in the following: Referring to Fig. 1, I take an armature $1^1$, like that of Figs. 2 and 3, and provide the field member with a completely distributed compensating winding 5 connected in series with the armature winding $1^1$ to coöperate therewith and designed to substantially neutralize the reaction of the armature winding. I next experimentally determine the number of ampere turns required in a distributed exciting winding 6 connected in series with the armature and compensating windings, which will produce efficient and satisfactory universal operation under predetermined conditions of load. What I do in practice is to vary the number of ampere turns in this exciting winding, testing the motor on both alternating and direct currents of the same voltage for efficiency and universal operation with each number of ampere turns in this exciting field winding and under predetermined conditions of load. The number of ampere turns in this exciting field winding may be varied by means of taps on the winding, by shunting current from the winding, or by assembling on the stator member of the motor, exciting windings of different numbers of turns. Tests, made as indicated above, show that maximum efficiency is obtained with a certain number of turns, the efficiency being lower for either a greater or less number of turns. If the number of turns is too few, a large current will flow, due to the low counter-electromotive force, and high copper losses will result, and if the number of turns is too high, the core loss will be high due to the high field flux and the copper loss in the exciting field winding will also be high due to its high resistance, and consequently for both of these conditions, poor efficiency will result. The winding giving most nearly the same speed on both alternating and direct currents is the one having the lowest number of exciting turns, as this gives the least field inductance. If the maximum efficiency point is well defined, it is selected, if at the same time good commutation and reasonably good universal operation obtain. It often happens that the maximum efficiency point is not well defined, that is, the number of turns may be varied over quite a range without materially affecting the efficiency. Under these conditions, a number of exciting ampere turns is selected, within this range, that gives satisfactory universal operation and commutation. After thus determining empirically the proper number of ampere turns in the exciting winding, I proceed to design my motor. If C is the number of ampere turns in the compensating winding, and E the number of ampere turns in the exciting field winding, as determined above, then in accordance with my invention, the number of ampere turns in my single equivalent winding is equal to the square root of $$C^2 + E^2.$$

The axis of this single field winding is displaced from the axis of the armature winding by the angle $\theta$, whose cosine is equal to $$\frac{C}{\sqrt{C^2 + E^2}}.$$

Another method of procedure for designing my motor may be followed. Since in the formulae above, the number of compensating ampere turns C can always be calculated, and knowing that the motor is to operate at a certain speed and that this speed requires a certain exciting field strength, the ampere turns E for obtaining this field strength can be obtained from calculated saturation curves or from saturation curves of previous designs and other fundamental data. After thus calculating the values of C and E, the number of ampere turns in my single equivalent winding is obtained as above and is equal to the square root of $$C^2 + E^2,$$

and its axis is displaced from the axis of the armature winding by the angle $\theta$, the cosine of which is calculated as above and is equal to $$\frac{C}{\sqrt{C^2 + E^2}}.$$

In order to completely neutralize the armature reaction, the number of ampere turns C is made equal to the number of armature ampere turns. I have found it advantageous in certain motors to over-compensate them by using a number of ampere turns C in calculating the winding 4, which is greater than the number of armature ampere turns, in order to improve the commutation of my motor. As shown in Figs. 2 and 3, the field winding 4 is preferably a completely distributed winding, and may be a concentric winding as shown in Fig. 3, or any well-known form of winding. In actual practice, each of the coils of both the armature winding 1 and the field winding 4 of Fig. 3, are composed of a number of turns so that the relation of ampere turns above described obtain. I may also provide the armature with two or more coils per slot instead of one as shown.

Referring to the flux diagram of Fig. 4, curve L is a curve of the flux distribution caused by the armature reaction, curve M is a curve of the flux distribution of the compensating winding 5 of Fig. 1, curve N is a curve of the flux distribution of the exciting winding 6 of Fig. 1 and curve O is the resultant curve of flux distribution due to the windings 5 and 6. The effective flux is represented by the light cross-hatching between the curve N and the axis. It will be noted that this flux distribution curve is peaked, which means that for a certain flux required a greater excitation is necessary than if the flux curve were flat.

Also in the diagram of Fig. 4, I have represented by curve P, a curve of the flux produced by the field winding 4 of Figs. 2 and 3, and by curve R, the effective field flux. The effective flux is also represented by the heavy cross-hatching between the curve R and the axis. This effective flux curve is quite flat, and consequently for any particular field strength, less excitation is required than with the arrangement of Fig. 1. My motor therefore will operate at a better power-factor and at a higher efficiency than the motor of Fig. 1. The brush position is denoted by the finely dotted lines SS, and it will be seen from an inspection of Fig. 4, that the brushes in my arrangement, although operating in a slight field, will not be in such a strong field as to cause poor commutation. In other words, the field winding of my motor is designed so as to substantially compensate for the armature reaction and at the same time provide an exciting field.

Although I have illustrated diagrammatically a two pole motor, my invention is applicable to a motor of any number of poles.

I desire it to be understood that I have used the expression "the number of compensating ampere turns necessary for substantially neutralizing the reaction of the armature winding", both in the specification and claims to include not only the number of compensating ampere turns necessary to just neutralize the armature reaction, but also to include such a number of compensating ampere turns as will over-compensate the armature reaction if it is found desirable to do so in order to aid the commutation of the motor as pointed out above. Furthermore, I desire it to be understood that my invention is not limited to the peculiar arrangement shown and described, and I aim in the appended claims to cover all modifications which do not depart from the spirit and scope of my invention.

What I claim as new and desire to secure by Letters Patent of the United States, is,—

1. A commutator motor designed for operation on either alternating or direct currents comprising an armature winding and a field winding connected in series therewith, the number of ampere turns in said field winding being equal to the square root of $$C^2 + E^2,$$

where C is the number of compensating ampere turns necessary for substantially neutralizing the reaction of the armature winding and E is the number of exciting ampere turns necessary for giving efficient and satisfactory operation as a universal motor, the axis of said field winding being displaced from the axis of said armature winding by an angle whose cosine is $$\frac{C}{\sqrt{C^2+E^2}}.$$

2. A commutator motor designed for operation upon either alternating or direct currents comprising an armature winding and a completely distributed field winding connected in series therewith, the number of ampere turns in said field winding being equal to the square root of $$C^2 + E^2,$$

where C is the number of compensating ampere turns necessary for substantially neutralizing the reaction of the armature winding and E is the number of exciting ampere turns necessary for giving efficient and satisfactory operation as a universal motor, the axis of said field winding being displaced from the axis of said armature winding by an angle whose cosine is $$\frac{C}{\sqrt{C^2+E^2}}.$$

3. A commutator motor designed for operation on either alternating or direct currents comprising an armature winding and a field winding connected in series therewith, the number of ampere turns in said field winding being equal to the square root of $$C^2 + E^2,$$

where C is the number of compensating ampere turns necessary for substantially neutralizing the reaction of the armature winding, said number of compensating ampere turns being substantially equal in number of the armature ampere turns, and E is the number of exciting ampere turns necessary for giving efficient and satisfactory operation as a universal motor, the axis of said field winding being displaced from the axis of said armature winding by an angle whose cosine is $$\frac{C}{\sqrt{C^2+E^2}}.$$

4. A commutator motor designed for operation upon either alternating or direct currents comprising an armature winding and a completely distributed field winding connected in series therewith, the number of ampere turns in said field winding being equal to the square root of $$C^2+E^2,$$

where C is the number of compensating ampere turns necessary for substantially neutralizing the reaction of the armature winding, said number of compensating ampere turns being substantially equal in number to the armature ampere turns, and E is the number of exciting ampere turns necessary for giving efficient and satisfactory operation as a universal motor, the axis of said field winding being displaced from the axis of said armature winding by an angle whose cosine is $$\frac{C}{\sqrt{C^2+E^2}}.$$

In witness whereof, I have hereunto set my hand this 31st day of Dec., 1917.

ALFRED F. WELCH.

---

Correction in Letters Patent No. 1,328,467.

It is hereby certified that in Letters Patent No. 1,328,467, granted January 20, 1920, upon the application of Alfred F. Welch, of Fort Wayne, Indiana, for an improvement in "Universal Motors," an error appears in the printed specification requiring correction as follows: Page 3, line 128, for the word "of" read *to;* and that the said Letters Patent should be read with this correction therein that the same may conform to the record of the case in the Patent Office.

Signed and sealed this 16th day of March, A. D., 1920.

[SEAL.]

M. H. COULSTON,

*Acting Commissioner of Patents.*

Cl. 172—276.